United States Patent [19]

McIntyre

[11] 4,392,688
[45] Jul. 12, 1983

[54] CROP OR PRODUCT CARRIER

[76] Inventor: James A. E. S. McIntyre, Wythall Estate, Wythall, Walford, Ross-on-Wye, Herefordshire HR9 5SD, England

[21] Appl. No.: 191,812

[22] Filed: Sep. 26, 1980

[30] Foreign Application Priority Data

Aug. 4, 1980 [GB] United Kingdom ............... 8025368

[51] Int. Cl.³ ............................................. B60P 1/16
[52] U.S. Cl. ................................... 298/22 R; 220/93; 298/17 R
[58] Field of Search ............... 414/458, 469, 471, 495, 414/98, 99, 100; 220/93; 296/39 R; 298/1 B, 11, 17, 22 R; 53/536

[56] References Cited

U.S. PATENT DOCUMENTS

| 2,935,218 | 5/1960 | Fritz | 414/495 |
| 3,408,108 | 10/1968 | Duda | 220/93 X |
| 3,501,039 | 3/1970 | Mitsuyasu | 414/458 |
| 3,722,716 | 3/1973 | Tantlinger | 414/495 X |
| 4,030,751 | 6/1977 | Bobka | 414/469 X |
| 4,173,422 | 11/1979 | Baker et al. | 296/39 R X |
| 4,189,133 | 2/1980 | Arrasmith et al. | 414/100 X |

Primary Examiner—Robert G. Sheridan
Attorney, Agent, or Firm—Young & Thompson

[57] ABSTRACT

A trailer is provided in the form of a container having side walls (20, 21, 22) and a movable base (23) which can be raised and lowered within the side walls under control of a ram (25). Thus the height of the base can be adjusted as a crop or product begins to fill the space available above the base in a raised position and by this means the extent of drop of the crop or product into the container can be made as small as possible so that the possibility of damage is significantly reduced. The base can be supported by scissor arms (27, 28) and can also be locked in the lower position to the container walls so that when the ram (25) is operated the walls and base will be tilted together about a pivot (32) for unloading.

6 Claims, 4 Drawing Figures

CROP OR PRODUCT CARRIER

Certain crops or products are of a fragile or easily damaged nature if dropped from a large height. Crops, such as potatoes, are lifted in large quantities and conveyed to a crop carrier which will remove the crop from the field to a storage area. Normally the crop will be raised by a conveyor to a position above the top of the crop carrier and then dropped into the interior of the carrier. At first, therefore, the crop will fall a substantial distance and the chances of bruising and other damage occurring is quite high. Consequently when the crop is stored for long periods the bruised crop will tend to deteriorate rapidly and can cause rotting of previously undamaged crop.

It is an object of this invention to reduce the amount of damage produced in feeding crops or products into a carrier so that the life and quality of the crop or product will be improved.

Accordingly this invention provides a crop or product carrier comprising a container having side walls and a base which can be lowered progressively under control of a lifting and raising mechanism with respect to the side walls as the crop or product quantity increases within the container.

With such an arrangement, as the quantity of crop or product builds up within the container, the base will be lowered to enable a further quantity to be incorporated. It is possible to ensure that the extent of drop into the conveyor remains substantially constant at all stages of loading and of course that the extent of the drop will be quite small.

In the preferred embodiment hydraulic or pneumatic rams are provided to control lowering of the base. In one arrangement the rams could be situated at the four corners of the base. In order to enable the base to be lowered to the maximum extent within the side walls it is preferred that each ram should be connected between the base and a member extending beyond the top of the side walls of the container. Advantageously the rams will be independently operable so that the base can be tipped, either to cause the crop to be spread more evenly within the container or, during unloading, to cause the crop to be tipped towards an outlet point.

A more preferred construction is provided by having the base supported on scissor arms, one end of each scissor arm being pivotally attached respectively to the base and a side wall on an extension thereof, whilst the other end of each scissor arm is slidably engaged respectively with the base and the side wall on an extension thereof.

The rams could be arranged to be operated as a result of increased loading as the weight of crop within the carrier increases. Alternatively, there could be a pressure responsive device which controls operation of a solenoid which in turn controls operation of the rams. Thus an initial loading could cause the rams to lower the base at a continuous slow rate. Alternatively the pressure responsive device could control a number of separate solenoids which would operate at different loadings so as to cause the base to be lowered in separate steps as the load increases.

The sides of the base may contact the side walls by means of flexible flaps, rollers or brush filaments which will prevent the crop or product from falling out through the bottom of the container whilst keeping frictional resistance to a minimum. In the preferred embodiment locking means is provided for securing the base in the lowered position within the container. The base and side walls may then be arranged for pivoting together about one end to tip the container for unloading. This enables the means for raising and lowering the base to act so as to tip the container when the locking means secures the base in the lowered position.

Ideally the container will have a wall at one end which can be raised or lowered to provide an outlet opening and a ramp leads down to below the level of the base from the outlet opening. It is also preferred that the floor of the base should be covered with a non-rigid material which will cushion the shock of a crop or product falling onto the floor.

Where the carrier is to take the form of the trailer, wheels will be provided enabling the container to be moved along the ground. It may be advantageous to provide that a viewing and controlling cab should be provided outside the container, which incorporates controls for determining movement of the base with respect to the sides of the container. Ideally the cab will be able to swivel about a vertical axis so that the direction in which the cab faces may be modified.

The invention also extends to a crop or product carrier of this invention as hereinbefore defined including a conveyor for lifting the crop or product from outside the container to a position above the top of the container.

The invention may be performed in various ways and preferred embodiments thereof will now be described with reference to the accompanying drawings, in which:-

Figure 1:
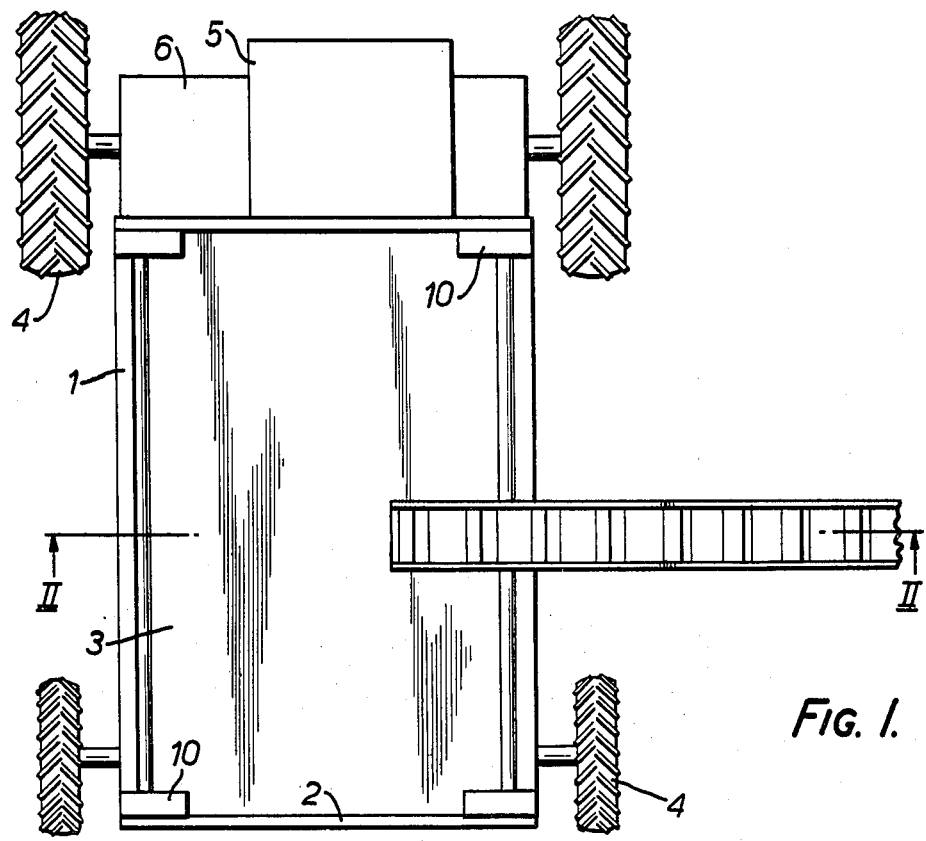
FIG. 1 is a plan view of one form of crop carrier of this invention.
Figure 2:
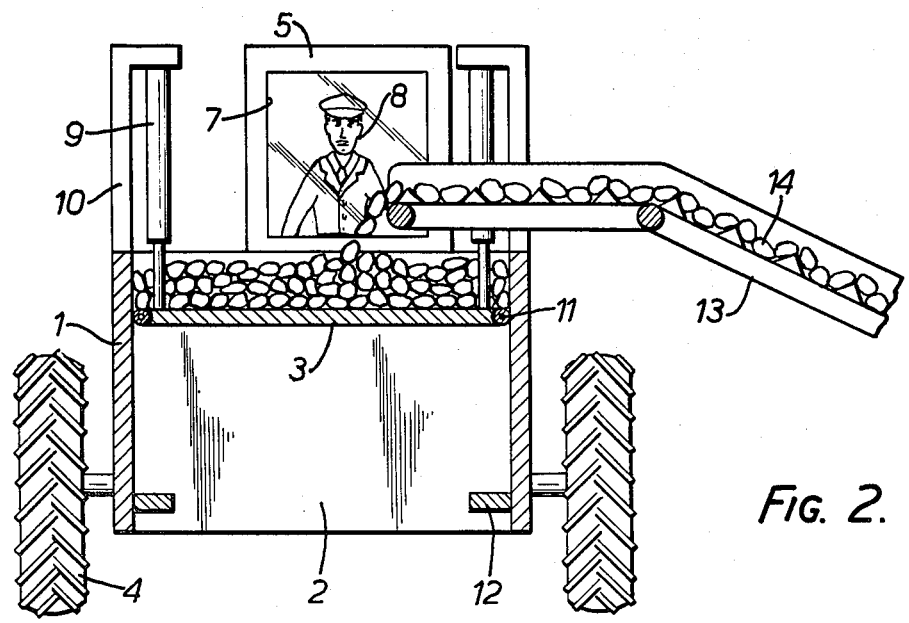
FIG. 2 is a vertical cross-section on line II—II of FIG. 1.

The crop carrier illustrated in FIGS. 1 and 2 comprises a container having fixed side walls 1 and end walls 2, and movable base 3, the container being mounted on four wheels 4. At one end of the container there is provided a viewing and control cab 5 mounted above a drive unit 6 for one pair of wheels 4. The cab has a viewing window 7 through which an operator 8 may inspect the progress of loading within the container and control this process by operating control members within the cab 5.

As shown particularly in FIG. 2, the base 3 is mounted within the walls 1 and 2 by means of rams 9 secured to extensions 10 situated above the side walls 1. The rams can be operated to cause the base 3 to be lowered and thus increase the internal volume of the container. As the base 3 moves down within the side and end walls 1 and 2 rollers 11 will contact these walls. When the base 3 reaches its lowermost position it will be supported by members 12.

The drawings also illustrate a web conveyor 13 which is effective, in this instance, to carry potatoes 14 which have been lifted from the ground up to a position above the top of the container where they are dropped down towards the base 3. At the initial stage of loading the base 3 will be near the top of the walls 1 and 2 but as the crop quantity increases the base 3 will be progressively lowered under control by the operator 8. The rams 9 may be independently operated to cause the base 3 to tilt, thus spreading the crop more evenly within the container.

When it is desired to empty the container a door can be opened in the end wall 2 opposite to the cab 5 and near the bottom of this wall 2 so that the crop will automatically fall out. The base 3 may be tilted towards this opening to assist this operation.

Figure 3:
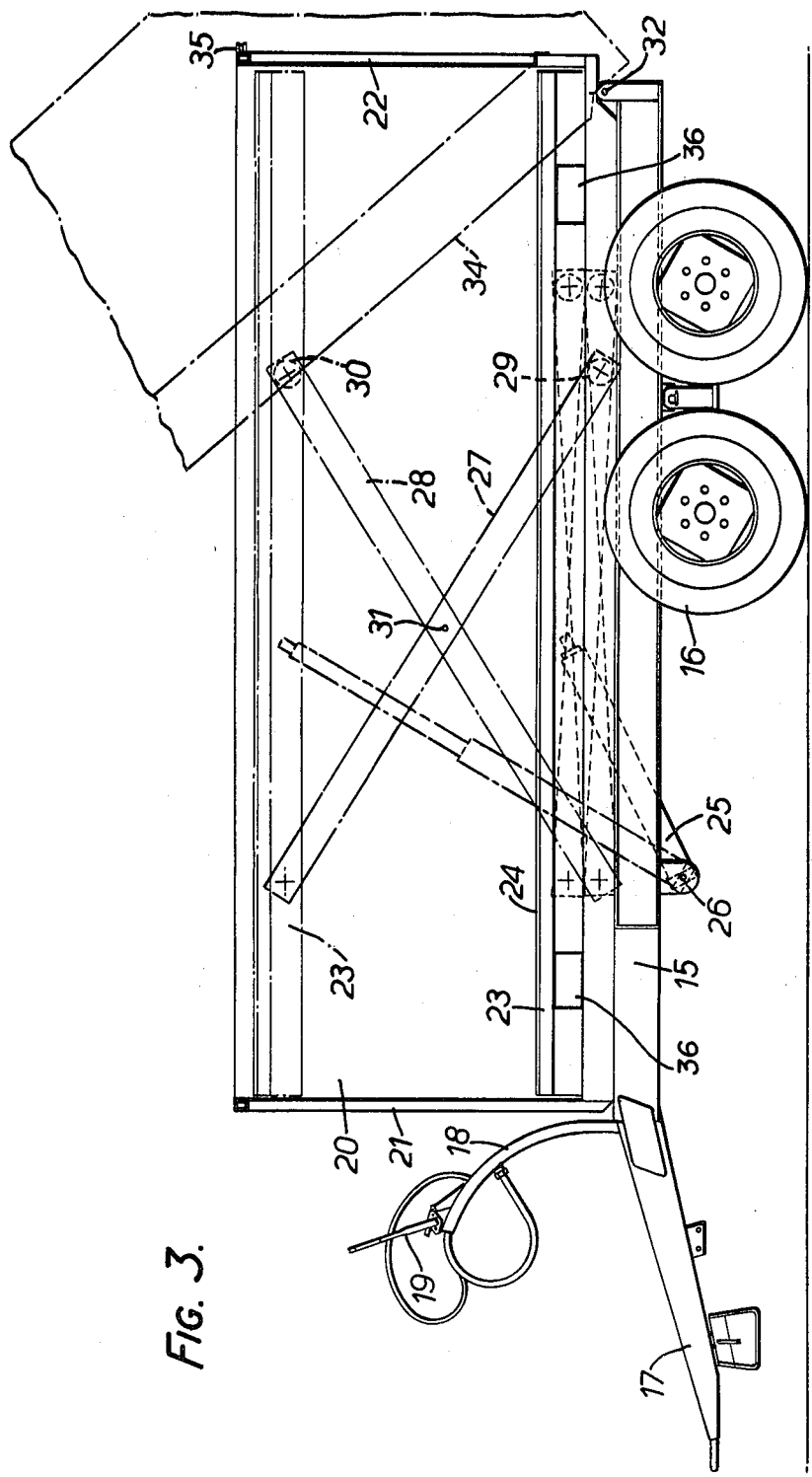
FIG. 3 is a side view, partly in section, showing the construction of another form of crop carrier of this invention in various attitudes.
Figure 4:
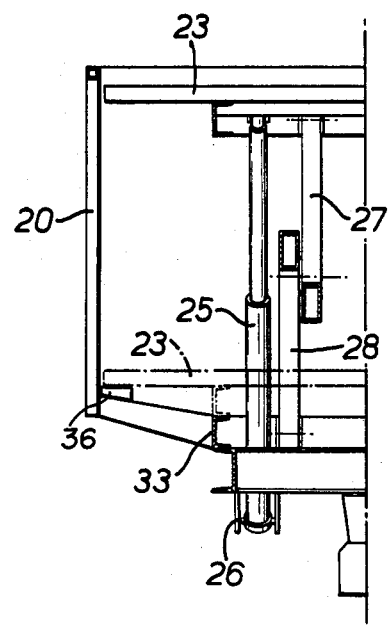
FIG. 4 is a vertical cross-section at right angles to the view of FIG. 3.

An alternative, and more versatile form of construction for a trailer having a base which can be raised is illustrated in FIGS. 3 and 4. A trailer chassis 15 is provided on wheels 16 and has a connecting linkage 17 which may be attached, for example, to a tractor. A hydraulic line 18 provided with a control lever 19 is also mounted on the chassis 15. The trailer has side walls 20 and end walls 21, 22 extending upwardly from the chassis 15 and there is a movable base or floor 23 positioned within these walls. The floor has a covering layer 24 of a resilient material and a flexible skirt (not shown) may be fitted around the edges of the base 23 to seal off the gap between the base and the walls 20, 21, 22. The base 23 may be raised and lowered by means of a hydraulic ram 25 pivotally mounted at one end to a bracket 26 fitted below the chassis 15 and at the other end to a central point on the base 23. When the ram is operated the base 23 is caused to rise and is maintained in a horizontal attitude by means of scissor arms 27 and 28. One end of the arm 27 is pivotally mounted on the base 23 whilst the other end is slidably positioned to move along a portion of the chassis 15 via a roller 29. The other arm 28 is pivotally attached at one end to the chassis 15 whilst the other end is able to slide beneath the base 23 via a roller 30. The scissor arms 27, 28 are pivotally secured together at their mid points 31. The position of the base 23, ram 25 and scissor arms 27, 28 with the base 23 in the raised condition is illustrated in FIG. 3 in dot-dash outline whilst the attitude of the scissor arms 27, 28 with the base 23 in its lowered position are illustrated in FIG. 1 in dashed outline.

The position of the base 23 of the trailer can therefore be modified at will by operating the ram 25 via the hydraulic line 18 and of course the manual control lever 19 could be replaced by an automatic control unit in the form of a solenoid to operate the ram 25 and a crop load sensing device responsive to the weight carried by the base 23. Ideally a ram 25 and associated scissor arms 27, 28 will be positioned to either side of the base 23 so as to produce a stable construction. A locking device 36 is provided which holds the base 23 down at the bottom of the container to enable the base 23 to be secured to the walls 20 and 21 of the trailer so that, when the ram 25 is operated the base 23 cannot be caused to rise within the trailer walls. However the side walls 20 of the trailer are pivotally mounted on the chassis 15 about a pivot 32 so that when, in this instance, the ram 25 is operated the base 23 in combination with the walls 20 and 21 will be caused to rotate about the pivot 32 until the base 23 and support members 33 therefor reach the maximum tilt position as indicated in dashed outline at 34 in FIG. 3. The rear wall 22 of the container is pivotally mounted to the side walls 20 at 35 so that, when retaining catches (not shown) are released the door 22 will swing open as the trailer is tilted to allow crops or other products within the trailer to be unloaded. If desired a ramp member could be provided to lead from the rear of the trailer downwardly to enable products being emptied to slide down onto the ground or, for example, a conveyor, and thus avoid a large drop.

Whilst the apparatus has been shown for use in harvesting potatoes it may readily be utilised for other crops such as carrots, onions, sugar-beet, parsnips and bulbs, for instance. Fruit such as apples, pears and plums may also be harvested by the trailer illustrated and in all cases the degree of bruising of the crop will be much reduced as compared with an operation using a conventional trailer with a fixed base. Furthermore whilst the crop carrier of FIGS. 1 and 2 has been shown as a self-propelled trailer the cab 5 and drive mechanism 6 thereof may be omitted if desired and the trailer could then be pulled by a tractor. In this latter case some automatic means for causing the rams 9 to lower the base 3 may be needed. This could be a pressure responsive device which would either cause continuous lowering upon first registering the weight of crop supplied or operate progressively as the weight of crop increased. For instance, means could be provided in the form of an air bag, tension springs or other ram configurations than those illustrated in the drawings. Whilst the apparatus of FIGS. 1 and 2 has been shown with rams 9 controlling movement of the base 3, a slip clutch with chains and pulleys could be used as an alternative control device.

Whilst the lifting and raising mechanism could be under manual control it may well be preferred to provide an automatic form of control, such as hydraulic sensors which will trigger a stage of lowering of the base of the container by triggering the solenoid controlled operation of the ram 25. Another method of control would be to provide a photocell responsive to a light beam projected across the container at a predetermined maximum loading level. Thus when the crop or product exceeds that level the photocell will be cut off from the light beam and this would generate a signal to the solenoid to cause the lifting and raising mechanism to be lowered.

I claim:

1. A crop or product carrier comprising a container having side walls, end walls and a base, at least one fluid powered ram forming part of a lifting and lowering mechanism enabling the base to be raised and to be lowered progressively with respect to the side walls and end walls as the crop or product quantity increases within the container, a pivot at one end of the container enabling the base, side walls and end walls to pivot about said one end to tip the container for unloading, the end wall at said one end of the container being operable to provide an outlet opening for discharge of the crop or product during unloading, locking means for securing the base in the lowered position within the container, the means for raising and lowering the base also acting to tip the container about the pivot for unloading when the locking means secures the base in the lowered position.

2. A crop or product carrier according to claim 1, wherein the lifting mechanism incorporates scissor arms supporting the base, one end of each scissor arm being pivotally attached respectively to the base and a side wall, whilst the other end of each scissor arm is slidably engaged respectively with the base and the side wall.

3. A crop or product carrier according to claim 2, including scissor arms at both sides of the container.

4. A crop or product carrier according to claim 1, including contact members attached to the sides of the base to provide contact with the side walls.

5. A crop or product carrier according to claim 1, provided with a non-rigid covering for the floor of the base.

6. A crop or product carrier according to claim 1, provided with wheels enabling the container to be moved along the ground.

* * * * *